(No Model.)

G. A. PARMENTER.
AUTOMATIC LIFE GUARD FOR STREET CARS.

No. 489,716. Patented Jan. 10, 1893.

Witnesses:
Walter E. Lombard.
W. H. Douglass.

Inventor:
George A. Parmenter,
by N. C. Lombard
Attorney.

UNITED STATES PATENT OFFICE.

GEORGE A. PARMENTER, OF CAMBRIDGE, MASSACHUSETTS.

AUTOMATIC LIFE-GUARD FOR STREET-CARS.

SPECIFICATION forming part of Letters Patent No. 489,716, dated January 10, 1893.

Application filed July 9, 1892. Serial No. 439,494. (No model.)

*To all whom it may concern:*

Be it known that I, GEORGE A. PARMENTER, of Cambridge, in the county of Middlesex and State of Massachusetts, have invented a new and useful Automatic Life-Guard for Street-Cars, of which the following, taken in connection with the accompanying drawings, is a specification.

My invention relates to automatic life guards for street cars, is especially adapted for use on electric and cable cars and it consists in certain novel features of construction, arrangement and combination of parts which will be readily understood by reference to the drawings, and to the claims hereinafter contained and in which my invention is clearly pointed out.

Figure 1:
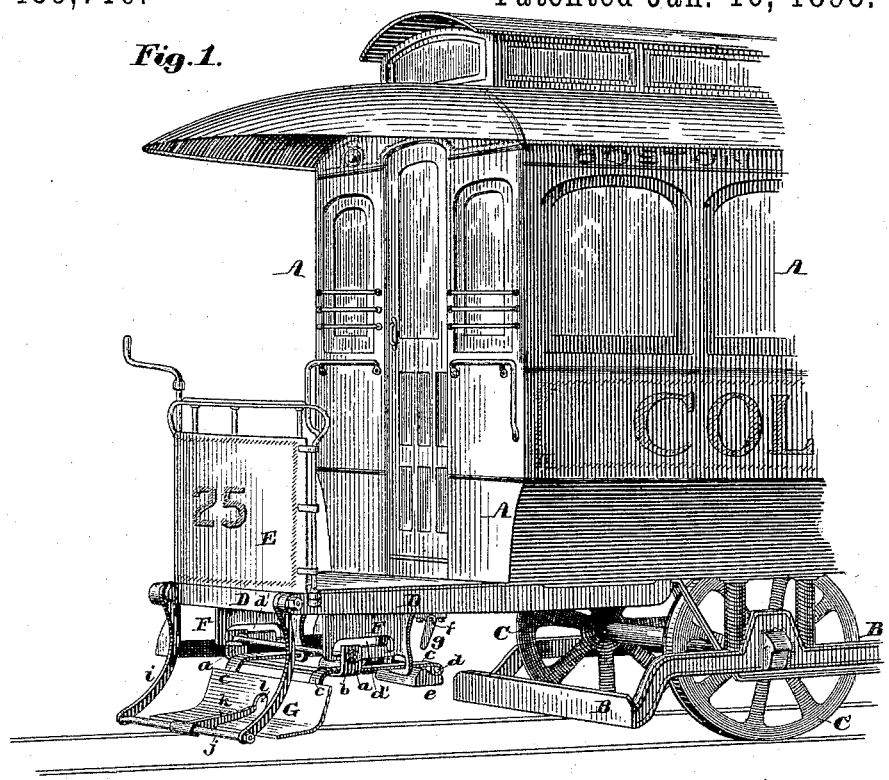
Figure 2:
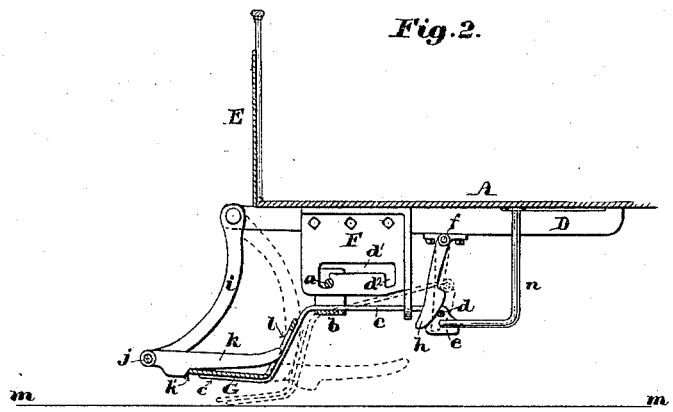

Figure 1 of the drawings is a perspective view of a portion of a street car with my invention applied thereto. Fig. 2 is a vertical longitudinal section of so much of the same as is necessary to illustrate my invention.

In the accompanying drawings A is the body of the car B the truck frame C C a pair of the truck wheels, D the platform and E the dasher all constructed in any well known manner.

To the underside of the platform D is firmly secured in fixed positions the two stands F F having slats $d'$ as shown and having mounted in bearings formed in the forward ends of said slats the shaft $a$ in such a manner that, by raising it, it may be moved to the rear of said slats for a purpose which will hereinafter appear.

The shaft $a$ has firmly secured thereon the upturned ends of the plate or bar $b$ upon which are secured, in positions at right angles thereto, the plates or bars $c\ c$ which project both forward and backward from said plate or bar $b$ as shown. The plates or bars $c\ c$ are bent downward just in front of said bar $b$ at an angle, to within about six inches more or less of the track rails from which points they extend forward in a horizontal or nearly horizontal direction said bars being located one directly above each track rail so that their forward ends shall rest upon said rails when depressed as shown in dotted lines in Fig. 2.

G is a plate secured to the forward arms of the bars $c\ c$ and extending toward the rear nearly to the bar $b$ and having a length transversely of the car equal to the width of the truck frame from outside to outside said plate serving when depressed into the position shown by dotted lines as a scoop or scraper to pick up any person or other obstruction on the pavements in front of the car.

The rear ends of the bars $c\ c$ are connected together by the rod $d$ upon which are secured a counter weight or weights $e$ sufficient to normally hold the plate G in the position shown in full lines in Figs. 1 and 2.

A shaft $f$ is mounted in suitable bearings beneath the platform D directly above the rod $d$ when said rod and bars $c\ c$ and plate G are in the position shown in the drawings said shaft $f$ having secured on each end thereof an arm $g$ by which it may be oscillated when desired and said shaft also has secured thereon near the middle of its length the pendent hook $h$ the shoulder of which engages the rod $d$ when it is raised by depressing the front edge of the plate G as shown in dotted lines in Fig. 2 in which position it holds said parts until the hook is disengaged by moving said shafts $f$ about its axis by means of one or the other of the arms $g$.

To the front end of the platform D are pivoted the two curved arms $i, i$, one at each side or corner of said platform, the lower or free ends of which are connected together, rigidly, by the rod $j$ upon the middle of which is mounted, so as to be freely movable about the same, the latch lever $k$, provided with the shoulder $k'$ which engages with the front edge of the scoop plate G, when in its raised position, for the purpose of holding said bar $j$ in its normal position in advance of said scoop plate, as shown in Figs. 1 and 2.

The plate G has a slot or opening $l$ cut through its rear or inclined portion for the passage of the rear portion of the latch lever $k$ when the rod $j$ is moved toward the rear by coming in contact with an obstruction.

The rear ends of the slots $d'$ are provided with a bearing at $d^2$ to receive the shaft $a$ whenever it is desired to move the scoop plate G farther beneath the platform when it is on the rear end of the car.

The operation of my invention is as follows. The several parts being in the position shown in full lines in the drawings if a person gets upon the track in position to be struck by the car, the rod $j$ or the lower end of one of the arms $i$ will first come in contact with the person, and by doing so will be moved toward the rear the shoulder $k'$ of the latch lever $k$ rising over the edge of the scoop plate G and depressing it into the position shown in dotted lines with its front edge as close to the pavements as it can be without striking the same with the under sides of the lower portions of the bars $c\ c$ resting upon the upper surfaces of the track rails represented by the line $m$ in Fig. 2. In this position the plate G will strike the person whether in an upright or prostrate position so far below the center of the weight as to pick him or her up thereon and effectually prevent the car passing over the body thus greatly increasing the chances of saving the person's life. If desired the shaft $a$ at the rear end of the car may be removed from its bearing in the front end of the slot $d'$ to a bearing at $d^2$ at the rear end of said slots $d$, when the plate G will be so far beneath the platform that it cannot be utilized by the small boy for stealing a ride, and the rod $j$ and the arms $i\ i$ may be removed from the rear end of the car or be swung upward against and made fast to the rear dasher when not desired for use.

When the scoop plate G is moved to a position beneath the platform the weights on the rod $d$ tend to fall to the ground as the front edge of said plate is removed from beneath the latch lever and in order to prevent this the angularly bent rod $n$ is secured to the under side of the platform with its horizontal portion in position for the rod $d$ carrying the weights $e$ to rest thereon and maintain the bars $c\ c$ in substantially a horizontal position.

What I claim as new and desire to secure by Letters-Patent of the United States is

1. The combination with a street car of a scoop plate pivoted to the under side of the car platform and counterbalanced so as to be held normally in a position with its front edge raised above the track rails,—a rod or bar suspended by suitable pivoted arms in a position normally in front of said scoop,—a latch lever pivoted on said rod and constructed and arranged to engage the front edge of said scoop plate to hold said rod normally in advance of said scoop, and to ride upon said scoop and depress it when said rod is moved to the rear by striking an obstruction.

2. The combination with a street car of a pivoted scoop carried by bars having counterweights at their rear ends to normally hold the front of said scoop raised above the track rails,—a rod carried by the movable ends of a pair of radius arms pivoted to the front of the platform,—a latch lever carried by said rod and engaging the front edge of said scoop to normally hold said rod in a position in front of said scoop and to ride upon and depress said scoop when said rod is moved to the rear by striking an obstruction,—and a second latch lever constructed and arranged to engage the rear or weighted end of the scoop frame to hold it in position when the front edge of said scoop is depressed.

3. The combination with a street car of a pivoted scoop mounted in bearings beneath the car platform constructed and arranged to be held normally in a position with its outer edge raised above the track rails and adapted to be moved to the rear when not required for use,—a rod carried by the free ends of a pair of radius arms pivoted to the front of the platform,—a latch lever carried by said rod and constructed and arranged to engage the front edge of said scoop to hold said rod normally in a position in advance of said scoop and to ride upon and depress said scoop when said rod is moved to the rear by striking an obstruction.

In testimony whereof I have signed my name to this specification, in the presence of two subscribing witnesses, on this 6th day of July, A. D. 1892.

GEORGE A. PARMENTER.

Witnesses:
N. C. LOMBARD,
WALTER E. LOMBARD.